US012355351B2

United States Patent
Govindarajulu et al.

(10) Patent No.: US 12,355,351 B2
(45) Date of Patent: Jul. 8, 2025

(54) LOW POWER BOOST CONVERTER STARTUP WITH SOFT START AND OUTPUT VOLTAGE OVERSHOOT LIMITING

(71) Applicant: Silicon Laboratories Inc., Austin, TX (US)

(72) Inventors: Srikanth Govindarajulu, Austin, TX (US); Hatem M. Osman, Austin, TX (US); Michael D. Mulligan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 555 days.

(21) Appl. No.: 17/828,993

(22) Filed: May 31, 2022

(65) Prior Publication Data

US 2023/0387800 A1    Nov. 30, 2023

(51) Int. Cl.
*H02M 3/158*   (2006.01)
*H02M 1/36*    (2007.01)

(52) U.S. Cl.
CPC ............. *H02M 3/158* (2013.01); *H02M 1/36* (2013.01)

(58) Field of Classification Search
CPC ................................. H02M 3/158; H02M 1/36
See application file for complete search history.

(56) References Cited

U.S. PATENT DOCUMENTS

| | | | |
|---|---|---|---|
| 9,531,253 B2 | 12/2016 | Wahby et al. | |
| 10,348,283 B1 | 7/2019 | Sonntag et al. | |
| 10,423,174 B1 | 9/2019 | Sonntag et al. | |
| 10,778,099 B1 | 9/2020 | Womac et al. | |
| 2021/0194367 A1* | 6/2021 | Yu | H02M 3/158 |
| 2022/0385186 A1* | 12/2022 | Yoo | H02M 1/0095 |
| 2023/0059128 A1 | 2/2023 | Büthker et al. | |
| 2023/0120432 A1 | 4/2023 | Womac et al. | |

OTHER PUBLICATIONS

Analog Devices, "MAX17220-MAX17225 400mV to 5.5V Input, nanoPower Synchronous Boost Converters with True Shutdown," Rev. 8, Oct. 2021, 22 pages.
Maxim Integrated, "True-Shutdown Circuit," Application Note 4835, Feb. 7, 2011, 2 pages.

* cited by examiner

*Primary Examiner* — Rafael O De Leon Domenech
(74) *Attorney, Agent, or Firm* — Zagorin Cave LLP

(57) ABSTRACT

A method for operating a DC-DC converter circuit includes, in response to detecting a startup condition, charging an output capacitance coupled to an output node of the DC-DC converter circuit at a first rate in a first phase of a multi-phase startup mode of operation of the DC-DC converter circuit. The method includes, in response to an indication of an output voltage on the output node approaching an input voltage on an input node of the DC-DC converter circuit, controlling a current through an inductor using an oscillating signal in a second phase of the multi-phase startup mode of operation, thereby adjusting the output voltage to equal a target voltage level. The first rate may be the rate of charging an RC circuit including the output capacitance coupled to the output node.

20 Claims, 12 Drawing Sheets

LOW POWER BOOST CONVERTER STARTUP WITH SOFT START AND OUTPUT VOLTAGE OVERSHOOT LIMITING

CROSS-REFERENCE TO RELATED APPLICATION(S)

This application is related to U.S. patent application Ser. No. 17/828,994, filed on May 31, 2022, entitled "DYNAMICALLY BIASING A BULK NODE AND A GATE NODE OF A TRANSISTOR IN A DC-DC VOLTAGE CONVERTER," naming Srikanth Govindarajulu et al. as inventors, which application is hereby incorporated by reference.

BACKGROUND

Field of the Invention

The present invention is related to power converters and more particularly to switched-mode power converters.

Description of the Related Art

In general, battery-powered applications or other fixed power supply applications use power converters to generate usable voltage levels that differ from voltage levels provided by the fixed power supply. In a boost mode of operation, a conventional DC-DC converter generates an output voltage that is greater than the input voltage (i.e., steps up the input voltage to a higher voltage level) by storing energy in an inductor and releasing the stored energy to a load at a higher voltage. Referring to FIG. 1, DC-DC converter 100 includes switches S1, S2, S3, and S4 that are configured for boost operation by a control circuit (not shown) using switch settings. At startup of DC-DC converter 100, output voltage $V_{OUT}$ is 0 V. During a charge phase ($T_{ON}$) for inductor 101, switches S1 and S3 are closed and switches S2 and S4 are open causing inductor current to build up. During a discharge phase ($T_{OFF}$) for inductor 101, switches S2 and S4 are closed and switches S1 and S3 are open and the inductor transfers charge from input node 105 to output capacitor $C_{OUT}$ coupled to output node 103.

During $T_{ON}$, the voltage across the inductor is positive. During $T_{OFF}$, the voltage across the inductor is negative. FIG. 2 shows current flowing through the inductor during the charge phase and the discharge phase. The inductor current reaches peak current $I_P$ before the discharge phase begins. The conventional DC-DC boost converter draws a high current (i.e., in-rush current) from the source (e.g., a battery) when the output is turned on and is charged from 0 V. A high amount of current can degrade components and integrated circuit devices in the DC-DC converter. Components having higher power ratings are required to sustain high in-rush current, thus increasing system cost. In addition, since the system controller and associated memory are not enabled during startup and the system uses untrimmed devices during startup, the output voltage can overshoot beyond a target voltage level. Overshoot of the target output voltage can cause switch devices to break down. Accordingly, improved techniques for DC-DC voltage conversion are desired.

SUMMARY OF EMBODIMENTS OF THE INVENTION

In at least one embodiment, a method for operating a DC-DC converter circuit includes, in response to detecting a startup condition, charging an output capacitance coupled to an output node of the DC-DC converter circuit at a first rate in a first phase of a multi-phase startup mode of operation of the DC-DC converter circuit. The method includes, in response to an indication of an output voltage on the output node approaching an input voltage on an input node of the DC-DC converter circuit, controlling a current through an inductor using an oscillating signal in a second phase of the multi-phase startup mode of operation, thereby adjusting the output voltage to equal a target voltage level. The first rate may be the rate of charging an RC circuit including the output capacitance coupled to the output node.

In at least one embodiment, a DC-DC converter circuit includes an input node, an output node, and an output capacitance coupled to the output node. The DC-DC converter circuit further includes a control circuit configured to cause the output capacitance to be charged at a first rate in a first phase of a multi-phase startup mode of operation and in response to an indication of an output voltage on the output node approaching an input voltage on the input node, to control a current through an inductor using an oscillating signal in a second phase of the multi-phase startup mode of operation to adjust the output voltage to equal a target voltage level.

In at least one embodiment, a method for operating a DC-DC converter circuit includes generating an indication of whether an output voltage on an output node of the DC-DC converter circuit is approximately equal to an input voltage on an input node of the DC-DC converter circuit using a first comparator circuit and a second comparator circuit, the first comparator circuit having a lower resolution and lower power consumption than the second comparator circuit. The method includes biasing a bulk terminal of a transistor having a source terminal coupled to the output node based on the indication.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A low-power DC-DC voltage converter includes circuitry for multi-phase startup, an output voltage overshoot clamp, and bulk switching circuitry for graceful shutdown to an ultra-low-leakage state. Multi-phase start-up achieves a soft startup that prevents current flow through the inductor during startup from exceeding current flow through the inductor during normal operation of the DC-DC converter. In response to being enabled, the low-power DC-DC converter transitions through several phases of startup operation to ensure proper startup of the output. For example, the DC-DC converter transitions through a slow RC charging phase followed by an interval of lower-frequency switching and an interval of higher-frequency switching trading off startup time for peak current stress during the boost startup sequence. In response to the output voltage exceeding a power-on-reset threshold voltage, the output voltage is continuously monitored to prevent overshooting to an excessively high level during start-up. The low-power DC-DC converter consumes low current during shutdown with no conducting path to the output node. When in shutdown mode, the power transistor is biased to be in an ultra-low leakage state. Unlike a conventional DC-DC converter, which has a conducting path through a body diode of a p-type power transistor coupled directly to the output, the low-power DC-DC converter includes a bulk-switching circuit that prevents current flow from the input power supply to the output node.

Figure 3:
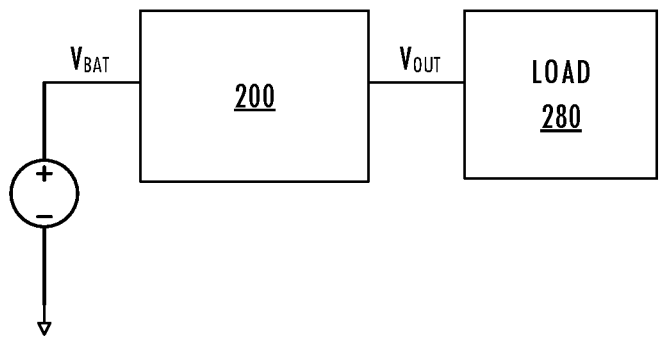
FIG. 3 illustrates a functional block diagram of a DC-DC voltage converter configured in a target application.

Referring to FIG. 3, DC-DC voltage converter 200 receives input voltage $V_{BAT}$ from a battery or other fixed power supply on a $V_{BAT}$ input node and generates an output voltage $V_{OUT}$ on a $V_{OUT}$ output node, which is coupled to load circuit 280. Load circuit 280 includes circuitry that is powered by the voltage provided on the $V_{OUT}$ output node where $V_{OUT} > V_{BAT}$, and may include a processor, memory, or other application-specific circuits.

Figure 4:
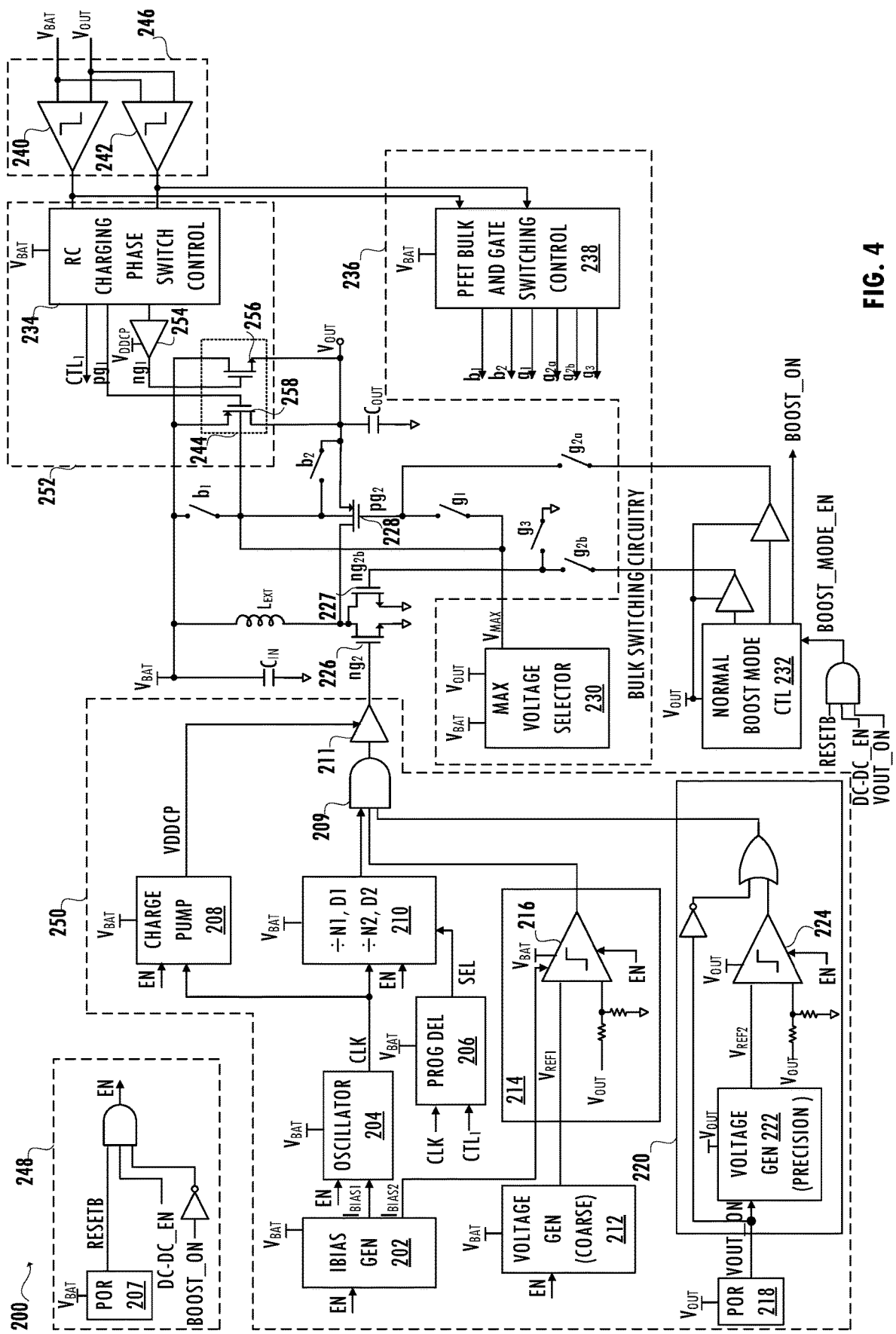
FIG. 4 illustrates a functional block diagram of startup circuitry including soft-start and output voltage overshoot clamp circuitry for a DC-DC voltage converter consistent with at least one embodiment of the invention.

Referring to FIG. 4, in at least one embodiment, DC-DC voltage converter 200 operates in various modes, e.g., multi-phase startup mode, normal boost mode, and shutdown mode, and includes various circuits to support those modes of operation. In at least one embodiment, transistor 228 is a p-type power transistor, e.g., a power metal-oxide-semiconductor field-effect transistor (MOSFET) that is designed to sustain substantial power levels and operate at high switching speeds at low power gate drive. For example, transistor 228 is a MOSFET having vertically diffused metal-oxide-semiconductor (VDMOS) structure, double-diffused metal-oxide-semiconductor (DMOS) structure, or laterally diffused metal-oxide-semiconductor (LDMOS) structure. In at least one embodiment of DC-DC voltage converter 200, transistor 226, transistor 227, transistor 256, and transistor 258 are also power transistors. In at least one embodiment of DC-DC voltage converter 200, transistor 226, transistor 227, transistor 228, transistor 256, and transistor 258 are high voltage transistors. In an exemplary integrated circuit manufacturing process, a high voltage transistor has a thicker gate oxide and thus, a higher breakdown voltage but slower speed than a normal transistor. Other transistors in DC-DC voltage converter 200 are normal MOSFETS.

In some embodiments, boost start-up circuit 250, RC charging phase circuit 252, comparators 246, and bulk switching circuitry 236 implement soft-startup and true shutdown of DC-DC voltage converter 200 to limit peak in-rush current, limit voltage overshoot during start-up, and gracefully shut down the DC-DC converter into an ultra-low leakage state having no conducting path from the $V_{BAT}$ input node to the $V_{OUT}$ output node. DC-DC voltage converter 200 reduces or eliminates the need to protect circuitry from excessive current stress and excessive voltage stress due to overshoot during start-up, thereby reducing the bill-of-materials for a target application including DC-DC voltage converter 200. DC-DC voltage converter 200 reduces or eliminates reverse current from flow to the input (e.g., into a battery, which may change the battery chemistry) and reduces or eliminates the need for reverse current protection circuits required by conventional DC-DC converters. In addition, the ultra-low leakage state of DC-DC voltage converter 200 increases battery life and enables customers to ship pre-connected batteries in target applications.

In at least one embodiment, enable circuit 248 generates a control signal EN having an active level (e.g., '1') in response to detecting a startup condition. Control signal EN enables various circuits of DC-DC voltage converter 200. In at least one embodiment, a signal on a terminal or pin of the integrated circuit triggers enable circuit 248. In at least one embodiment, software executing on a controller triggers a power-up sequence via control signal DC-DC_EN. In an embodiment, control signal EN has an active level in response to the reset signal for the integrated circuit not being asserted and control signal DC-DC_EN being active (e.g., '1').

In at least one embodiment, DC-DC voltage converter 200 includes comparators 246, which includes coarse comparator 240 and fine comparator 242 that compare output voltage $V_{OUT}$ to input voltage $V_{BAT}$. In an embodiment, coarse comparator 240 is an ultra-low power, coarse (i.e., low resolution, e.g., resolution of 50 mV to 100 mV) comparator that is always enabled when DC-DC voltage converter 200 is enabled. However, fine comparator 242 is a higher resolution (e.g., resolution of 2 mV to 5 mV) comparator that consumes substantially more (e.g., at least one order of magnitude more) power than coarse comparator 240. In an embodiment, fine comparator 242 consumes at least four orders of magnitude more power than coarse comparator 240. In an embodiment, fine comparator 242 consumes current in the range of tens of μA and coarse comparator 240 consumes less than 1 nA of current. Accordingly, fine comparator 242 is selectively enabled according to an active phase of the multi-phase startup operation of DC-DC voltage converter 200, as described further below. Fine comparator 242 is enabled only during a startup mode of operation and is disabled in the normal boost mode of operation. Comparators 246 provide indications of the comparisons to RC charging phase switch control circuit 234 and bulk switching circuitry 236, which use those indications to configure DC-DC voltage converter 200 in the various modes of operation, as described further below.

Figure 5:
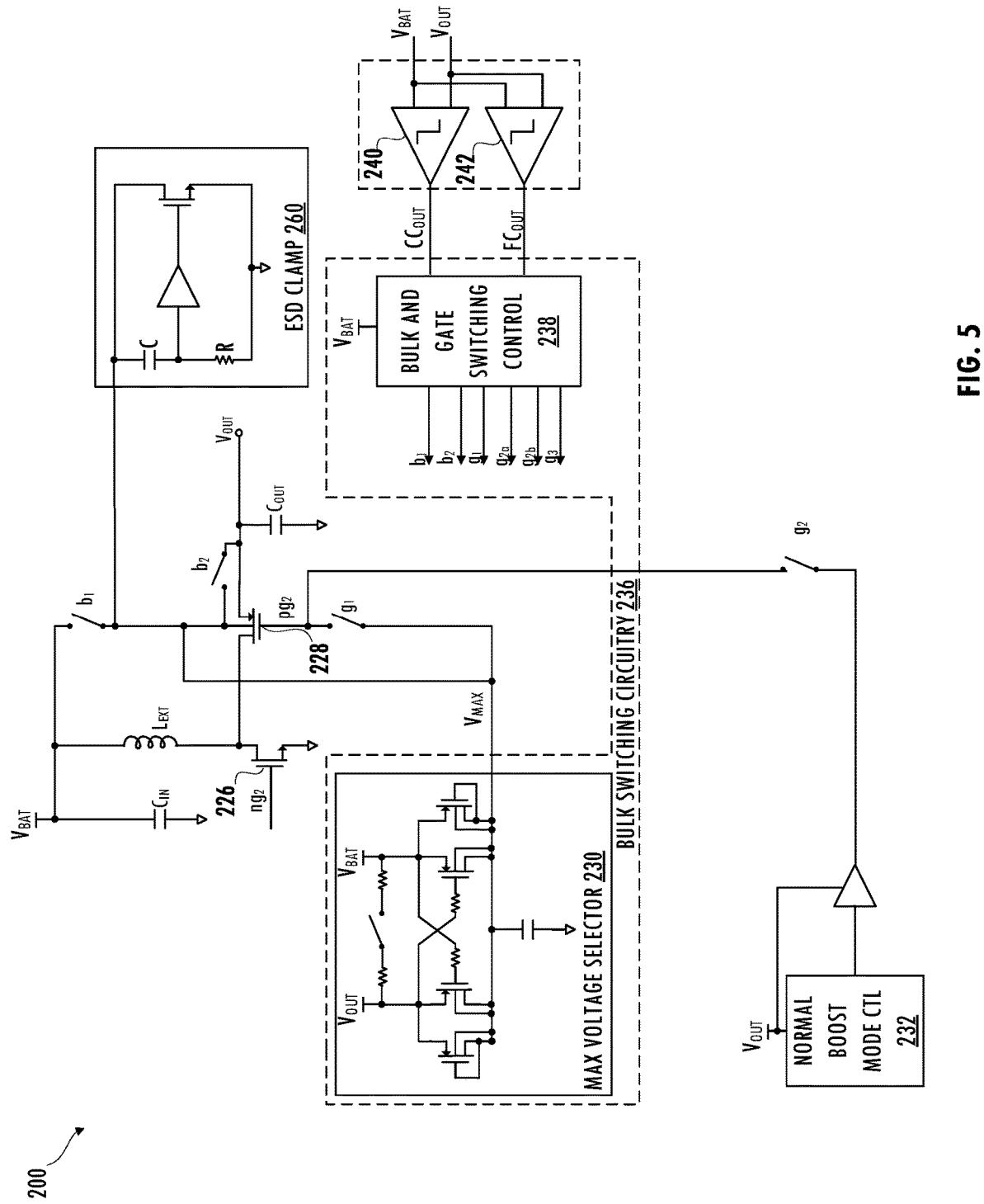
FIG. 5 illustrates a detailed diagram of bulk switching circuitry in the DC-DC voltage converter consistent with at least one embodiment of the invention.

In a conventional DC-DC voltage converter configured for boost operation, the bulk (e.g., the n-type well) of a p-type power transistor configured as a synchronous rectifier switch is connected to the output node since the output node is at the highest voltage in the system during normal DC-DC voltage converter operation. Referring to FIG. 5, in at least one embodiment of DC-DC voltage converter 200, p-type transistor 228 is configured as a synchronous rectifier switch. In all modes of operation, bulk switching circuitry 236 uses an indicator generated by coarse comparator 240, which has ultra-low power consumption, to determine how to bias the bulk of transistor 228. In response to the initiation of shutdown of DC-DC voltage converter 200 (e.g., when control signal EN transitions to an inactive value), normal boost mode control circuit 232 is shut down. PFET bulk and gate switching control circuit 238 disables transistor 227 and transistor 228 (i.e., the voltage on the gate of transistor 227 is ground, i.e., 0 V, and the voltage on the gate of transistor 228 is $V_{MAX}$), thereby disabling conduction through the channels of transistor 227 and transistor 228. Bulk and gate switching control logic 238 also controls switches b1 and b2 to keep the bulk of transistor 228 connected to the output node while output voltage $V_{OUT}$ remains higher than input voltage $V_{BAT}$. After leakage current discharges output capacitor $C_{OUT}$ to cause output voltage $V_{OUT}$ to be less than input voltage $V_{BAT}$, the output of coarse comparator 240 changes state and bulk and gate switching control logic 238 controls switches b1 and b2 to connect the bulk of transistor 228 to the input node, thereby reducing static leakage current of DC-DC voltage converter 200 by eliminating a conduction path from the input node to the output node and the inductor to the output, thereby causing output voltage $V_{OUT}$ to discharge to ground. Thus, when shutdown, DC-DC voltage converter 200 is configured in an ultra-low leakage state.

In at least one embodiment, DC-DC voltage converter 200 includes maximum voltage selector 230, which provides the greater of output voltage $V_{OUT}$ and input voltage $V_{BAT}$ as maximum voltage $V_{MAX}$. Bulk and gate switching control logic 238 couples maximum voltage $V_{MAX}$ to the gate of transistor 228 by closing switch g1, e.g., in the multi-phase startup mode of operation or in the shutdown mode of operation. In at least one embodiment, maximum voltage selector 230 includes a switch network of p-type transistors coupled back-to-back and in parallel to the bulk switching network to ensure that the bulk of the p-type transistor is always connected to the higher of the two voltages (i.e., the higher of input voltage $V_{BAT}$ and output voltage $V_{OUT}$), even when the ultra-low power comparator is not fully turned on, e.g., during an input supply ramp. However, since the p-type transistor network may not perform well when the input voltage is close to the output voltage, bulk and gate switching control logic 238 configures switches b1 and b2 during the startup sequence and the shutdown sequence according to the output of coarse comparator 240. In an embodiment, switches b1, b2, g1, g2a, g2b, and g3 include n-type and p-type transistors coupled in parallel and are sized to provide low resistance paths for transistor 228 and transistor 227. In some embodiments, gate control of the n-type transistors can be derived from an independent charge pump or a bootstrapped charge-pump, as needed. In at least one embodiment, electrostatic discharge (ESD) clamp 260 includes an RC edge-triggered NMOS circuit that is triggered by a fast-rising edge, e.g., a signal caused by an ESD strike on the bulk terminal of transistor 228.

FIGS. 6-10 illustrate the multi-phase startup mode of operation and a normal boost mode of operation of DC-DC voltage converter 200. In at least one embodiment, input voltage $V_{BAT}$ is in the range of 0.8 V≤$V_{BAT}$≤1.7 V, inductance L is 2.2 μH, input capacitance $C_{IN}$ is 4.7 μF, output capacitance $C_{OUT}$ is 10 μF, and output voltage $V_{OUT}$ is 1.8 V. However other input voltage ranges, device parameters, and output voltages may be used. Separate waveforms are illustrated for input voltage $V_{BAT}$=1.7 V, input voltage $V_{BAT}$=1.5 V, input voltage $V_{BAT}$=1.25 V, input voltage $V_{BAT}$=1 V, and input voltage $V_{BAT}$=0.8 V.

Figure 6:
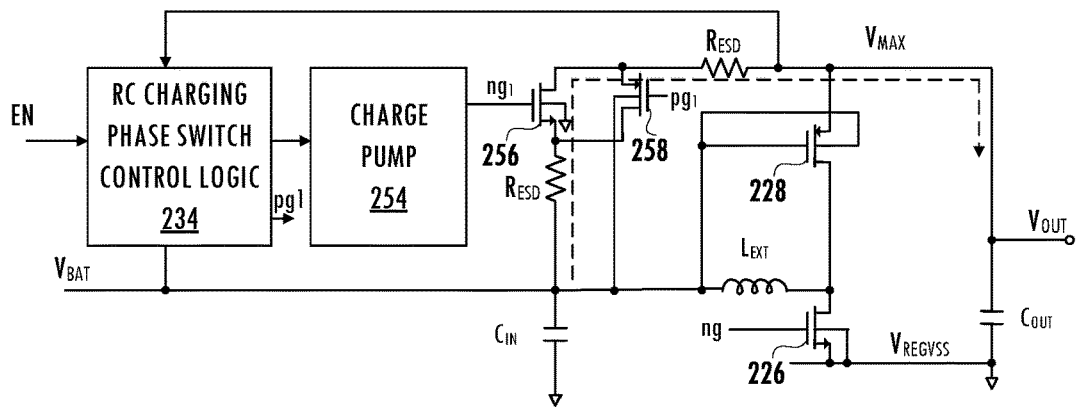
FIG. 6 illustrates a functional block diagram of the DC-DC voltage converter of FIG. 4 configured in an RC charging phase of a multi-phase startup mode of operation consistent with at least one embodiment of the invention.

Referring to FIGS. 4 and 6, in an RC charging phase of the multi-phase startup mode of operation, RC charging phase switch control logic 234 and charge pump 254 enable RC charging of $V_{OUT}$ output node via n-type transistor 256 and p-type transistor 258. Output voltage $V_{OUT}$ increases according to an exponential function, e.g., $V_{OUT}=V_{BAT}(1-e^{(-t/RC_{OUT})})$, where R is the resistance of the circuit path between the $V_{BAT}$ input node and the $V_{OUT}$ output node, and t is time. During the RC charging phase of the multi-phase startup, a substantial portion of an integrated circuit load (e.g., a processing circuit and associated memory) is still powered down and DC-DC voltage converter 200 charges $C_{OUT}$. Charge pump 254 generates a turn on voltage (e.g., 1.875×$V_{BAT}$, which is 1.5 V when $V_{BAT}$=0.8 V) for transistor 256 (e.g., n-type transistor) in response to an active value of control signal EN and while input voltage $V_{BAT}$ is greater than output voltage $V_{OUT}$. The active value of control signal EN causes charge to flow from the $V_{BAT}$ input node, through n-type transistor 256 and p-type transistor 258 thereby precharging the $V_{OUT}$ output node to a voltage level close to the input voltage (e.g., $V_{BAT}$−0.2 V, which is approximately 0.6 V in an exemplary embodiment where $V_{BAT}$=0.8 V). RC charging phase switch control logic 234 selectively enables RC charging phase switches 244 (e.g., n-type transistor 256 and p-type transistor 258) based on indications generated by comparators 246. In at least one embodiment, an ultra-low power, coarse (i.e., low resolution) comparison and a fine (i.e., higher resolution) comparison of output voltage $V_{OUT}$ to input voltage $V_{BAT}$ provide corresponding indicators of when the output node has been charged close to the input voltage and thus, when to enter a next phase of the multi-phase startup mode of operation. In at least one embodiment, coarse comparator 240 is a low-power comparator that is always enabled to monitor the output voltage.

Figure 11:
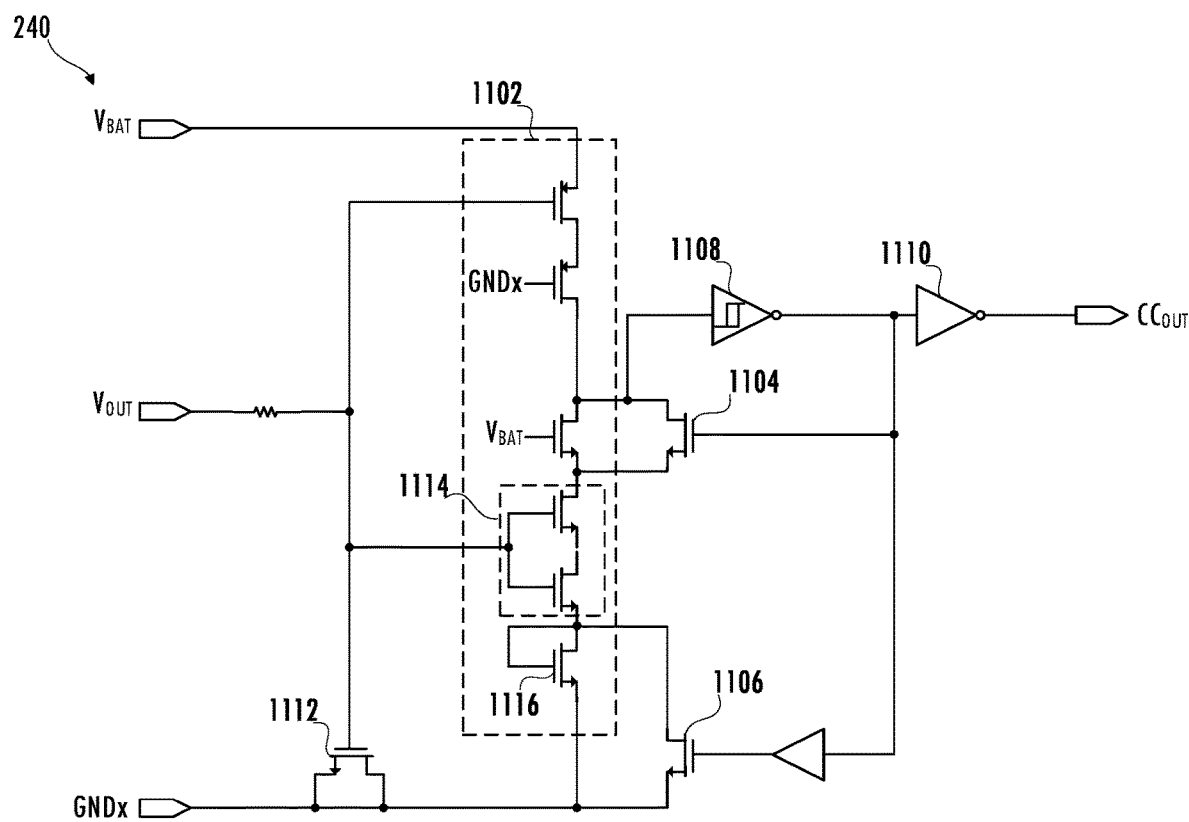
FIG. 11 illustrates an exemplary coarse comparator of FIG. 4 consistent with at least one embodiment of the invention.

Referring to FIG. 11, an embodiment of coarse comparator 240 includes input stage 1102, which has an inverting amplifier with n-type transistors that are much weaker than the p-type transistors thereby requiring output voltage $V_{OUT}$ to be close to $V_{BAT}$ for coarse comparison output signal CCOUT to transition low. In at least one embodiment, the output of the input stage is active low when $V_{OUT}$ is greater than $V_{BAT}$. Second stage 1108 includes a hysteretic inverting amplifier that amplifies the output of the first stage and provides hysteresis to prevent toggling back and forth around the trip point. In at least one embodiment, transistors 1104 and 1106 provide additional hysteresis using local feedback loops. Third stage 1110 further amplifies the output of the second stage, thereby providing a fast response to a change in $V_{OUT}$. In an embodiment, transistors 1114 are narrow-width long channel devices and transistor 1116 is a low voltage transistor. In an embodiment, a resistance and transistor 1112 coupled as a capacitance filter any noise on output voltage $V_{OUT}$. Coarse comparator 240 has low resolution as compared to the resolution of fine comparator 242 and unlike fine comparator 242, which consumes a significant amount of power, consumes no static power or at most negligible amounts of static power.

Figure 7:
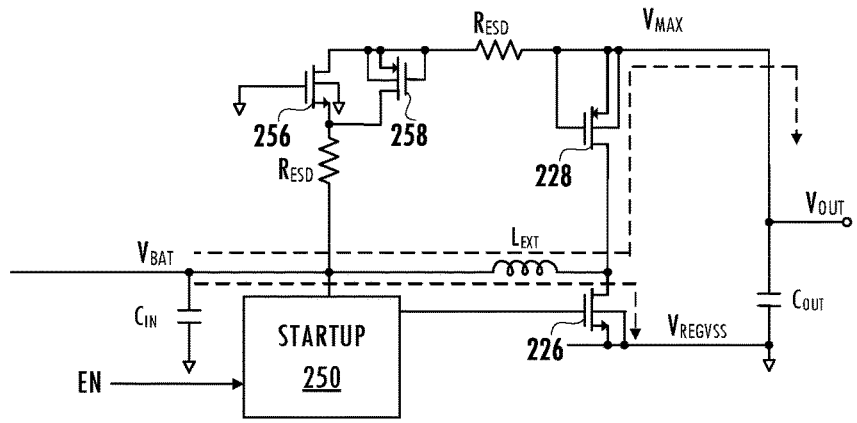
FIG. 7 illustrates a functional block diagram of the DC-DC voltage converter of FIG. 4 configured in a startup phase of the multi-phase startup mode of operation consistent with at least one embodiment of the invention.

Referring to FIGS. 4 and 7, in a switching phase of the multi-phase startup mode of operation, startup circuit 250 generates an oscillating control signal that controls transistor 226. In at least one embodiment, the oscillating control signal is based on the output of oscillator 204 and has a frequency and duty cycle determined by divider 210 according to control signal SEL. Divider 210 provides the oscillating control signal to logic circuit 209, which logically gates the oscillating control signal according to enabling conditions described further below. Buffer 211 and charge pump 208 adjust the voltage level of the oscillating control signal to sufficiently drive transistor 226, (e.g., an n-type transistor) via gate terminal ng2. In at least one embodiment, the oscillating control signal has a lower frequency and reduced duty cycle for a predetermined interval defined by a predetermined counter value before being increased to a higher frequency, and in some embodiments, a longer duty cycle. The predetermined counter value is selected to achieve sufficient build up across all process, voltage, and temperature variations. The switching frequency and duty cycle of the signal controlling transistor 226 are predetermined such that the inductor current completely discharges from cycle to cycle and no current builds up from one cycle to the next, thereby providing a well-controlled inductor peak current across the voltage range of input voltage $V_{BAT}$. In an alternative embodiment, instead of using a predetermined interval defined by a predetermined counter, the duration of the second phase of the multi-phase start-up sequence is determined by comparing output voltage $V_{OUT}$ to a predetermined threshold voltage. Meanwhile, the rest of DC-DC converter circuit 200 and the associated integrated circuit is powered-down, thereby limiting the load current to the DC-DC converter circuit. At the end of the predetermined interval, a start-up release signal is asserted to enable the rest of the integrated circuit to boot up and follow a normal power-up sequence once the output voltage crosses a power-on-reset threshold level.

After the predetermined interval of the low frequency phase of multi-phase startup mode of operation, output voltage $V_{OUT}$ is approximately 0.6 V above the threshold voltage of the fine comparator or output voltage $V_{OUT}$ is above input voltage $V_{BAT}$, thereby ensuring that the inductor sees sufficiently high negative voltage for the current to discharge completely during Toff. Then, startup circuit 250 enters a higher frequency phase of the multi-phase startup mode of operation and generates a higher frequency oscillating control signal, and in some embodiments, an increased duty cycle, to charge the output node to the target voltage level. In at least one embodiment, the duty cycle and frequency of the oscillating signal in the higher frequency phase of the multi-phase startup mode of operation are selected to operate over the entire range of input voltages and to support the maximum load current during startup. If the frequency is too fast or the duty cycle is too long, the inductor current will not reach zero between consecutive cycles. If the frequency is too slow or the duty cycle is too short, then the maximum load current during startup cannot be supported. The value of output capacitance $C_{OUT}$ is selected such that the output node is charged to a high enough voltage and provides low-voltage ripple during the normal boost mode of operation. If the voltage at the end of the high frequency phase is not far enough above a target output voltage at the end of the high frequency phase, then the voltage droops and causes the startup to return to the lower frequency phase and rather than start up, DC-DC voltage converter 200 oscillates between the lower frequency phase and the higher frequency phase of oscillating control signal.

The switching frequency and duty-cycle of the signal controlling transistor 226 are predetermined to support a maximum load coupled to the output node of the low-power DC-DC voltage converter during startup (e.g., 1.8 V output for <3 mA load). The frequency and duty cycle are predetermined to prevent inductor current build-up from cycle-to-cycle while still supporting a maximum load current imposed by the rest of the integrated circuit during power-up. During this phase, the inductor peak current does not increase from one cycle to the next since the output is already sufficiently charged up.

Figure 12:
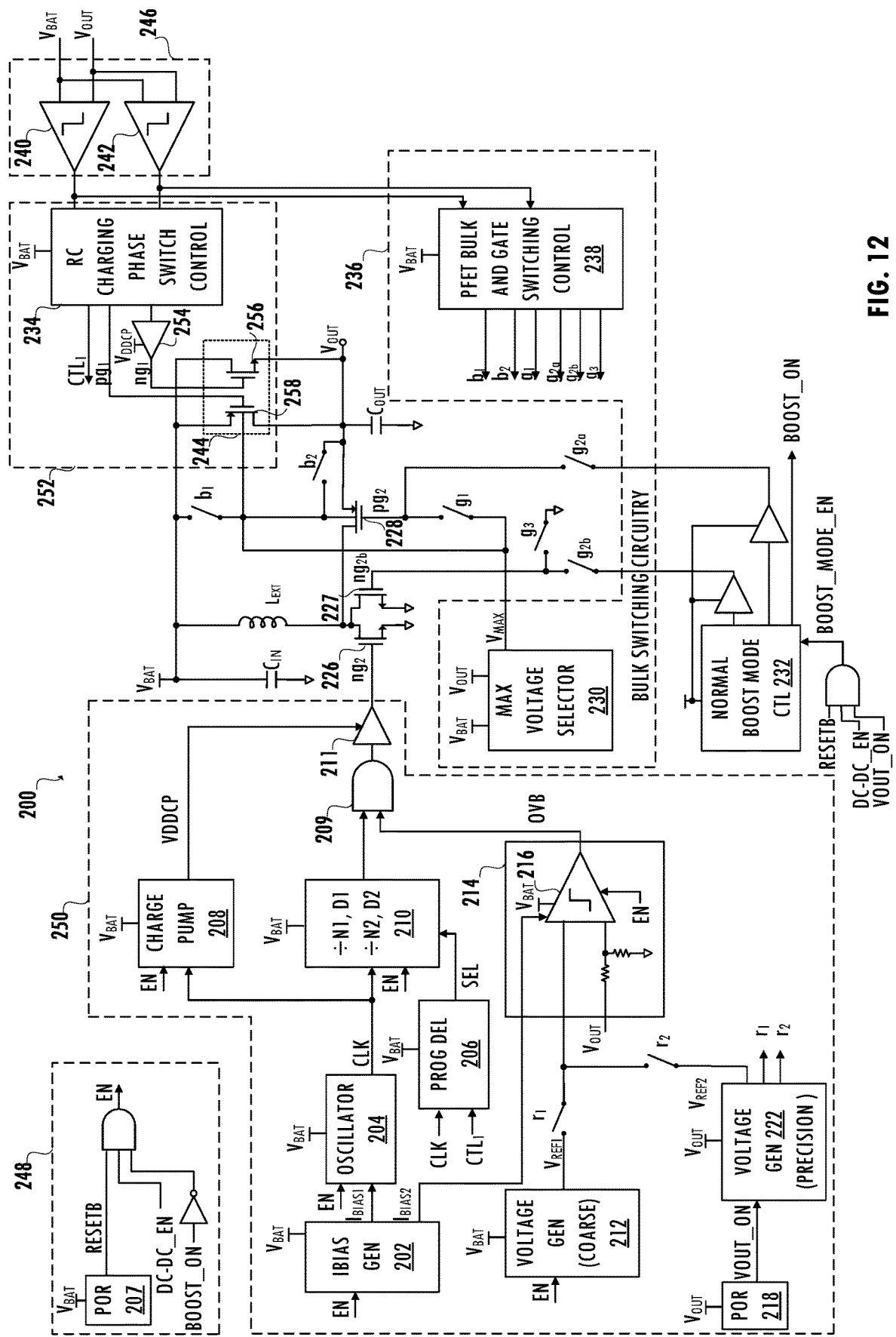
FIG. 12 illustrates an alternative embodiment of a DC-DC voltage converter consistent with at least one embodiment of the invention.

At the end of the startup sequence mode, when the output voltage approaches a target voltage level that exceeds a Power-On-Reset (POR) voltage level, $V_{OUT}$ POR circuit 218 enables circuit 220, which includes an over-voltage limit circuit that limits overshoot of a target voltage level by output voltage $V_{OUT}$. When enabled, comparator 224 monitors the DC-DC converter output with respect to predetermined reference voltage $V_{REF2}$ during the lower frequency phase of the multi-phase startup mode of operation and the higher frequency phase of a multi-phase startup mode of operation. Anytime during the lower frequency phase or the higher frequency phase, if output voltage $V_{OUT}$ exceeds predetermined reference voltage $V_{REF2}$, then the control signal provided to the gate of transistor 226 is disabled, thereby preventing DC-DC voltage converter 200 from delivering any more charge to output capacitance $C_{OUT}$ and limiting excessive output voltage build-up. Referring to FIG. 12, in an alternative embodiment, when output voltage $V_{OUT}$ exceeds the POR threshold and predetermined reference voltage $V_{REF2}$ is powered up and ready, then switches $r_1$ and $r_2$ decouple reference voltage generator 212 from comparator 216 and couple reference voltage generator 222 to comparator 216.

Figure 8:
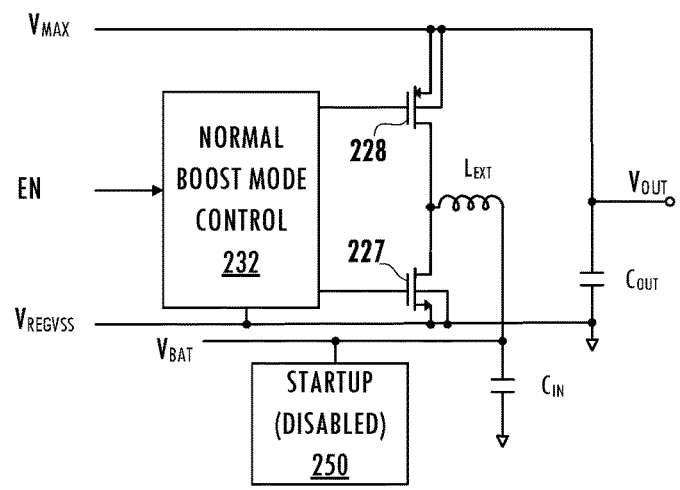
FIG. 8 illustrates a functional block diagram of the DC-DC voltage converter of FIG. 4 configured in a normal boost mode of operation consistent with at least one embodiment of the invention.

After charging the output node to a target voltage level, an associated controller circuit boots up and loads trim values from memory before entering a normal boost mode of operation. DC-DC voltage converter 200 transitions from using a diode rectifier switch during the multi-phase startup mode of operation to using a synchronous switch for high efficiency operation in the normal boost mode of operation. Referring to FIGS. 4 and 8, DC-DC voltage converter 200 uses trimmed voltages and accurately regulates the DC-DC converter output with finer resolution in the normal boost mode of operation than during the multi-phase startup mode of operation, which uses all untrimmed currents and voltages. After the completion of the multi-phase startup mode of operation, RC charging phase switch control circuit 234 and startup circuit 250 are disabled. Fine comparator 242 is disabled to reduce any static power loss. However, coarse comparator 240, which consumes at most negligible amounts of power, remains enabled.

Figure 1:
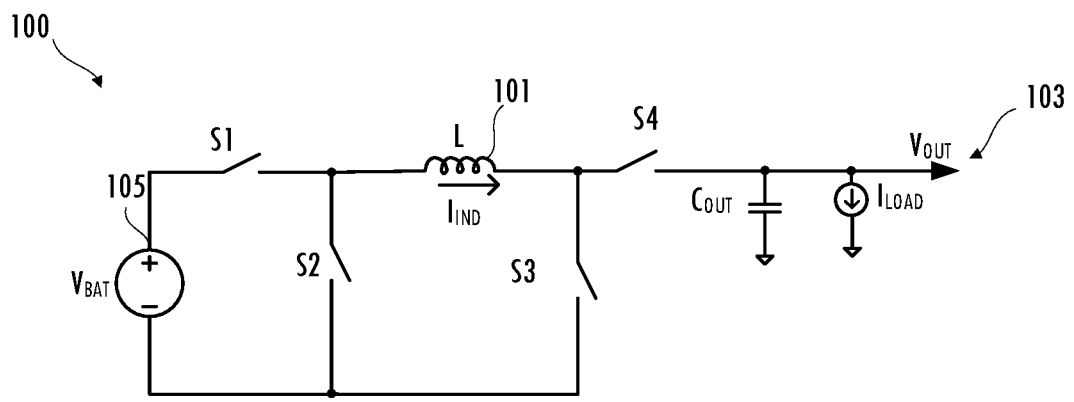
FIG. 1 illustrates a circuit diagram of a conventional DC-DC voltage converter.
Figure 2:
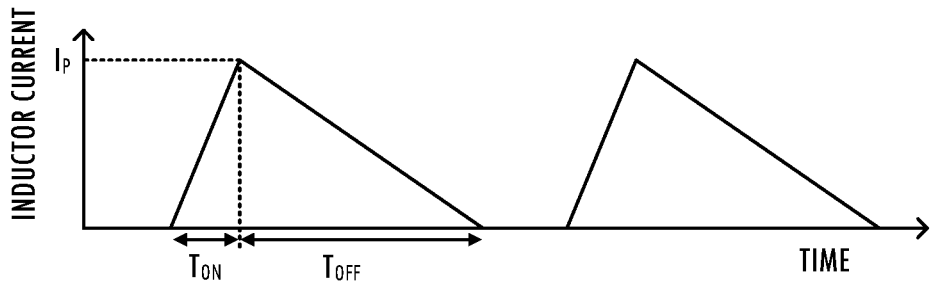
FIG. 2 illustrates inductor current as a function of time for the conventional DC-DC voltage converter of FIG. 1 configured in a boost mode of operation.

Normal boost mode control circuit 232 includes a feedback control circuit that drives the gate of transistor 228 and the gate of transistor 227 based on output voltage $V_{OUT}$ to achieve a target voltage level on the $V_{OUT}$ output node. In at least one embodiment, when start-up circuitry is disabled and transistor 226 is turned off, transistor 227, which is coupled in parallel with transistor 226, is used in the normal boost mode of operation. In an alternative embodiment, the gate of transistor 226 is coupled to startup circuit 250 or normal boost mode control circuit 232, e.g., using switches or other select circuit. In at least one embodiment, an additional transistor is coupled in parallel with transistor 227 (or in parallel with transistor 226 where transistor 226 is selectively coupled to startup circuit 250 or normal boost mode control circuit 232) to support higher inductor current during the normal boost mode of operation. In at least one embodiment, bulk and gate switching control logic 238 couples normal boost mode control circuit 232 to the gate of transistor 228 and the gate of transistor 227 by closing switches g2a and g2b in the normal boost mode of operation. Normal boost mode control circuit 232 controls the gate of transistor 228 and the gate of transistor 227 consistent with the conventional techniques described above for FIGS. 1 and 2, although other feedback control techniques may be used.

Figure 9:
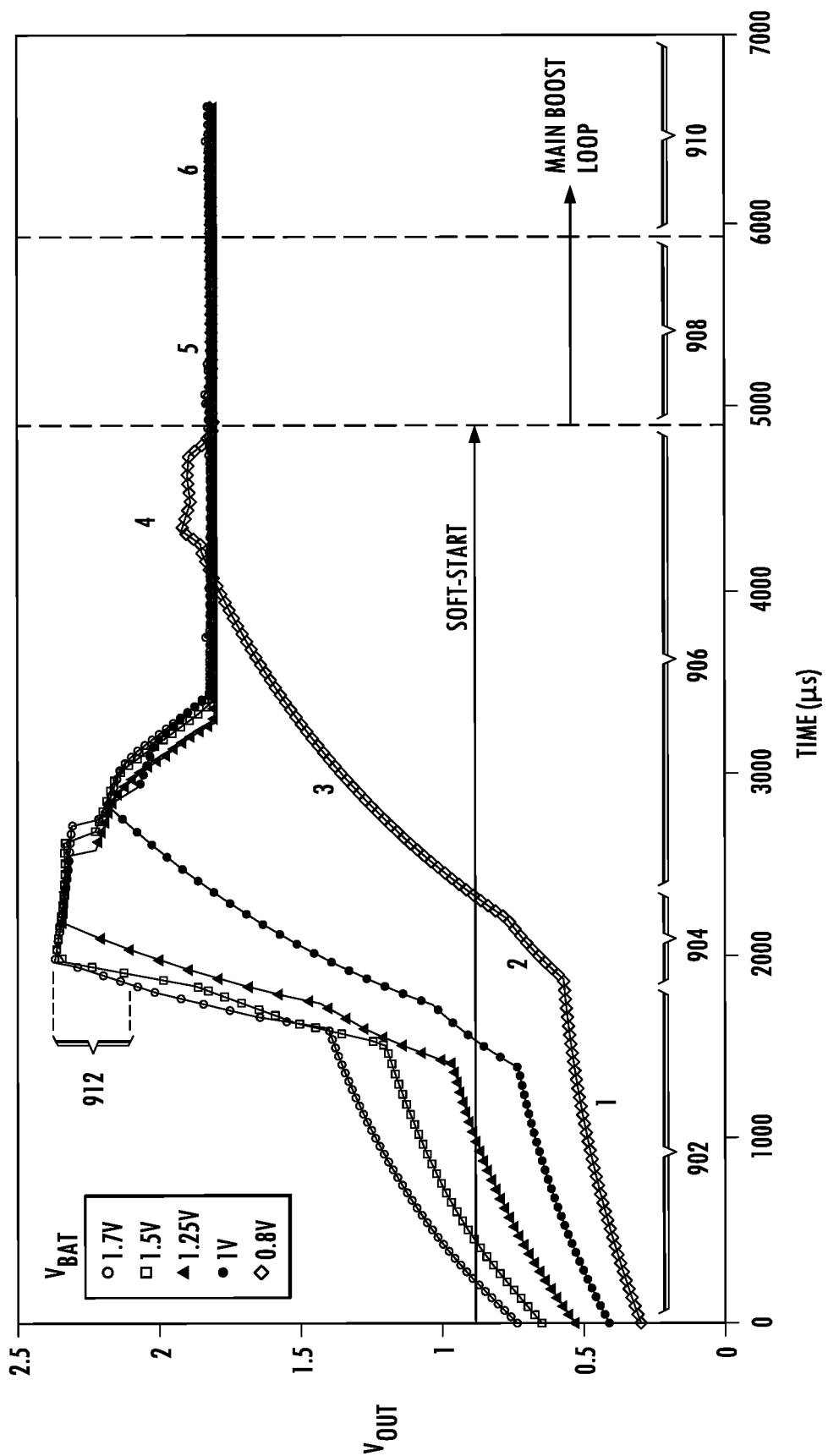
FIG. 9 illustrates exemplary waveforms of output voltage as a function of time for the multi-phase startup mode of operation and normal boost mode of operation of the DC-DC voltage converter of FIG. 4 consistent with at least one embodiment of the invention.
Figure 10:
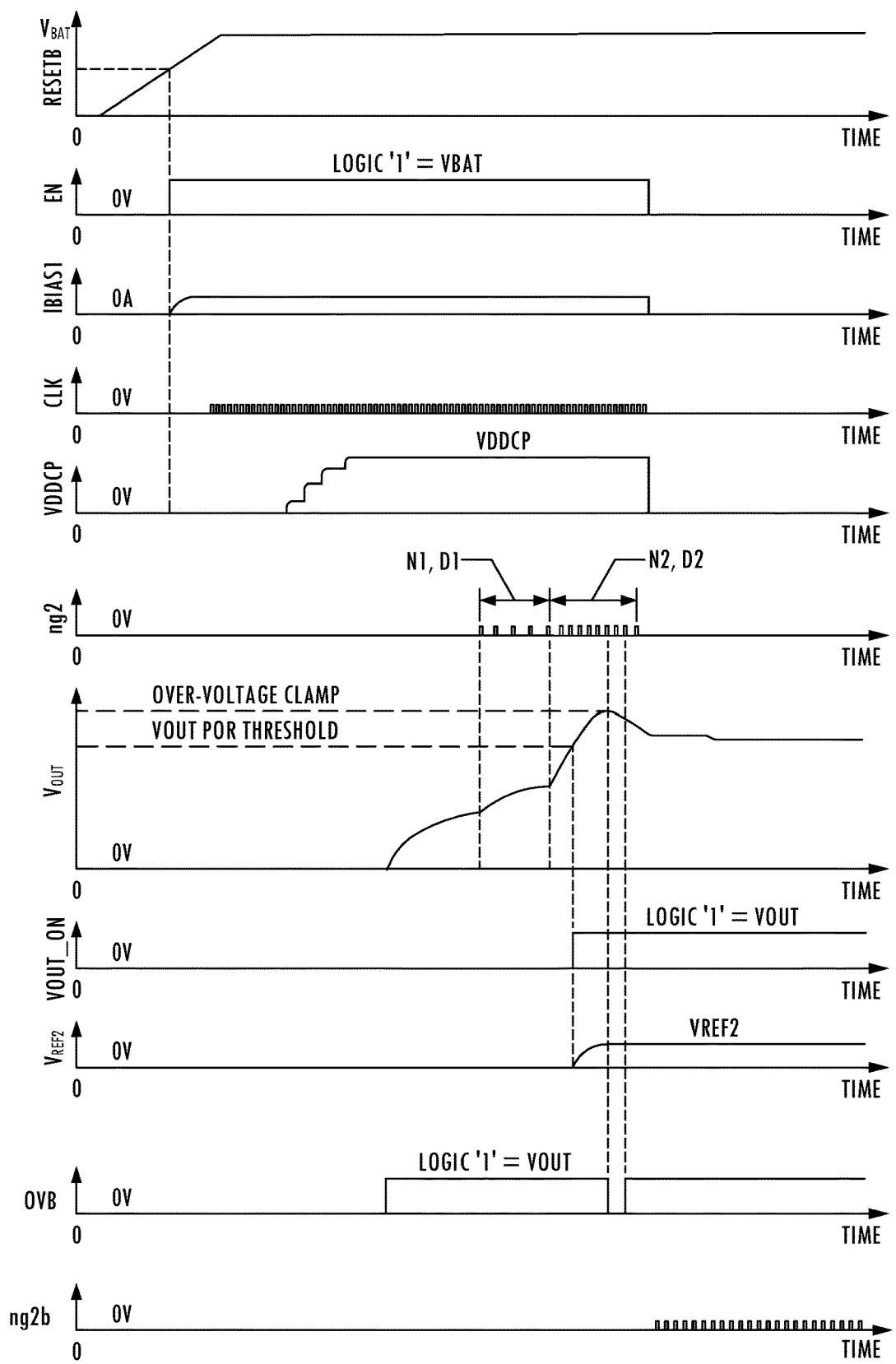
FIG. 10 illustrates exemplary waveforms for the DC-DC voltage converter of FIG. 4 consistent with at least one embodiment of the invention.

FIG. 9 illustrates output voltage $V_{OUT}$ as a function of time for various input voltages $V_{BAT}$ during the multi-phase startup mode of operation that includes a soft-start and output voltage over-shoot clamping and normal boost mode of operation. Referring to FIGS. 4 and 9, at time t=0, if control signal RESETB generated by $V_{BAT}$ power-on-reset circuit 207 indicates that the integrated circuit is not in a reset state (e.g., RESETB='1') and control signal DC-DC_EN indicates that the DC-DC voltage converter 200 is enabled (e.g., DC-DC_EN='1'), then enable circuit 248 asserts control signal EN and causes DC-DC voltage converter 200 to enter RC charging phase 902. DC-DC voltage converter 200 precharges the $V_{OUT}$ output node to a voltage based on $V_{BAT}$ (e.g., approximately $V_{BAT}$–0.2V). RC charging phase switch control circuit 234 generates control signal CTL1, which indicates when output voltage $V_{OUT}$ approaches input voltage $V_{BAT}$ (i.e., indicates when output voltage $V_{OUT}$ is substantially equal to but less than, e.g., within 200 mV or 25% of input voltage $V_{BAT}$) and causes programmable delay 206 to start an internal counter and DC-DC voltage converter 200 enters lower frequency and lower duty cycle phase 904.

Circuit 214 generates an indication of whether output voltage $V_{OUT}$ exceeds input voltage $V_{BAT}$ based on comparison of predetermined voltage $V_{REF1}$, generated by reference voltage generator 212, to output voltage $V_{OUT}$ using comparator 216. If output voltage $V_{OUT}$ falls below approximately $0.75 \times V_{BAT}$ during lower frequency and lower duty cycle phase 904 or higher frequency and higher duty cycle phase 906 of startup, DC-DC voltage converter 200 returns to the RC charging phase 902. In response to an active value of the output of comparator 216, then startup circuit 250 uses clock signal CLK and generates an oscillating control signal having a frequency and duty cycle selected by programmable delay 206 using control signal SEL. After a predetermined delay, programmable delay circuit 206 updates control signal SEL to cause DC-DC voltage converter 200 to enter higher frequency and duty cycle phase 906. Accordingly, divider 210 increases the frequency of the oscillating control signal to a second frequency that is greater than the frequency of reduced frequency and duty cycle phase 904, and in some embodiments, increases the duty cycle to a second duty cycle that is greater than the duty cycle of reduced frequency and duty cycle phase 904. The higher frequency and increased duty cycle are used to support an increased load current as other portions of the associated integrated circuit are powering up. In at least one embodiment, if output voltage $V_{OUT}$ is sufficiently high enough when circuit 214 enables the oscillating control signal after RC charging phase 902, then the startup sequence skips reduced frequency and duty cycle phase 904 and transitions directly to higher frequency and duty cycle phase 906, as illustrated in FIG. 9 for high levels of input voltage $V_{BAT}$.

In at least one embodiment of DC-DC voltage converter 200, $V_{OUT}$ power-on-reset circuit 218 enables reference voltage generator 222 and comparator 224 when the output voltage $V_{OUT}$ exceeds a predetermined power-on-reset threshold voltage. During reduced frequency and duty cycle phase 904 and higher frequency and duty cycle phase 906, circuit 220 includes comparator 224, which detects an overvoltage condition of output voltage $V_{OUT}$. Comparator 224 generates an indication of whether output voltage $V_{OUT}$ exceeds a predetermined threshold voltage level based on a comparison of predetermined threshold voltage $V_{REF2}$, which is generated by reference voltage generator 222, to output voltage $V_{OUT}$. If output voltage $V_{OUT}$ exceeds predetermined threshold voltage $V_{REF2}$, then transistor 226 is disabled until output voltage $V_{OUT}$ discharges to the target output voltage level. In an alternative embodiment, in response to output voltage $V_{OUT}$ exceeding a $V_{OUT}$ POR threshold value, reference voltage $V_{REF1}$ is deselected as an input to comparator 216 and reference voltage $V_{REF2}$ is selected as the input to comparator 216.

A start-up release signal is asserted to cause the rest of the integrated circuit to boot up and follow a normal power-up sequence in response to output voltage $V_{OUT}$ exceeding the power-on-reset threshold voltage. If output voltage $V_{OUT}$ droops below the target output voltage, startup operation resumes. Thus, the start-up with soft-start and overvoltage clamping technique maintains output voltage $V_{OUT}$ within a target voltage range. Main boost loop control initially begins using default trim values in normal boost phase 908. After loading trim values from memory, normal boost mode control circuit 232 continues to operate using fine regulation in phase 910.

Referring to FIGS. 4 and 9, note that when input voltage $V_{BAT}$=1.7 V, DC-DC voltage converter 200 skips reduced frequency and duty cycle phase 904 and transitions directly from RC charging phase 902 to higher frequency and higher duty cycle phase 906. When input voltage $V_{BAT}$=1.7 V, 1.5 V, or 1.25 V, output voltage $V_{OUT}$ exceeds an overvoltage limit in range 912 and DC-DC voltage converter 200 clamps the output voltage to return output voltage $V_{OUT}$ to a target voltage level.

Figure 13:
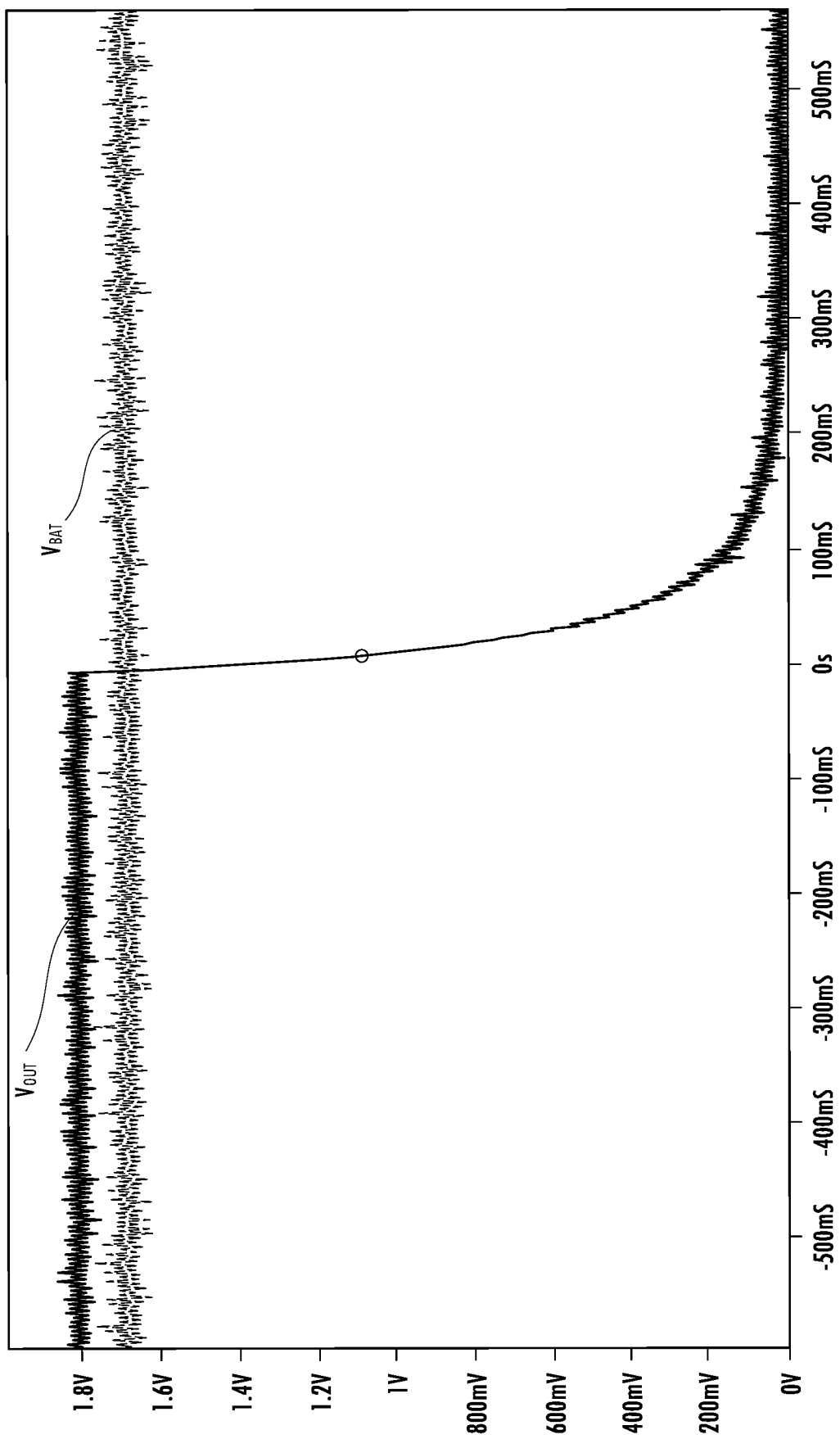
FIG. 13 illustrates exemplary waveforms for voltages as a function of time during shutdown of DC-DC voltage converter of FIG. 4 consistent with at least one embodiment of the invention.

Referring to FIG. 4, in a shutdown mode of operation, the bulk terminal of transistor 228 is coupled to the input node to reduce or eliminate any leakage current and configure the DC-DC voltage converter 200 in an ultra low-leakage state (e.g., negligible leakage). Throughout the multi-phase startup mode of operation, comparators 246 monitor output voltage on the $V_{OUT}$ output node with respect to the input voltage on the $V_{BAT}$ input node and switch the bulk terminal of the transistor 228. During the RC charging phase, the bulk and gate of transistor 228 (e.g., n-well of a p-type power transistor) is coupled to the $V_{BAT}$ input node since it has the highest voltage in the system at that time. In response to output voltage $V_{OUT}$ becoming approximately equal to input voltage $V_{BAT}$, the bulk and gate of transistor 228 is switched from being coupled to the $V_{BAT}$ input node to being coupled to the $V_{OUT}$ output node during lower frequency and lower duty cycle phase 904 and higher frequency and higher duty cycle phase 906 of the multi-phase startup. In lower duty cycle phase 904 and higher frequency and higher duty cycle phase 906, the p+ drain-to-bulk diode of the p-type transistor is used as the rectifier diode to conduct current to the output node. Referring to FIGS. 4 and 13, in an exemplary embodiment of DC-DC voltage converter 200, input voltage $V_{BAT}$ is 1.7 V and output voltage $V_{OUT}$ is 1.8 V. When DC-DC_EN toggles from an active level to an inactive level at time t=0 seconds, DC-DC voltage converter 200 enters a shutdown mode and output voltage $V_{OUT}$ discharges to 0 V.

Figure 14:
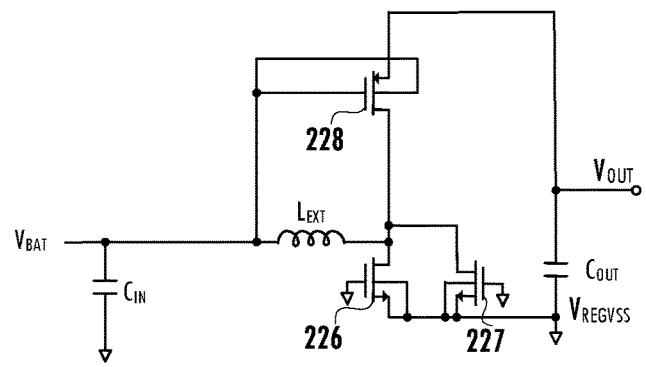
FIG. 14 illustrates exemplary waveforms for the DC-DC voltage converter of FIG. 4 dynamically biased in an RC charging phase of a multi-phase startup mode of operation or biased in a shutdown mode of operation consistent with at least one embodiment of the invention.
Figure 15:
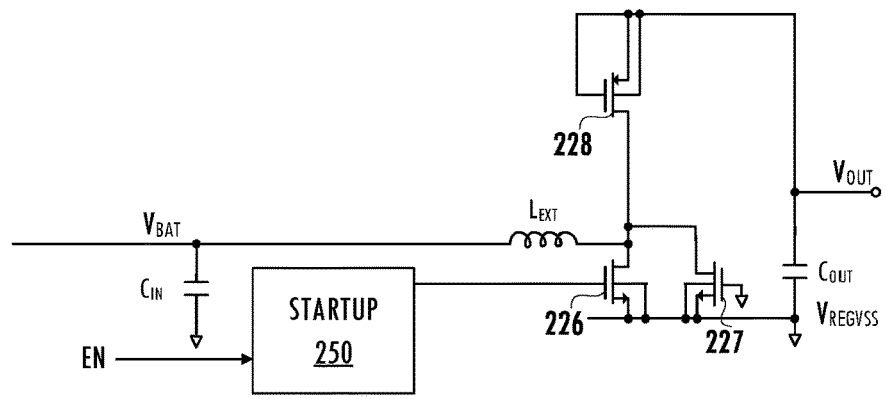
FIG. 15 illustrates a functional block diagram of the DC-DC voltage converter of FIG. 4 dynamically biased in the second phase and the third phase of the multi-phase startup mode of operation consistent with at least one embodiment of the invention.
Figure 16:
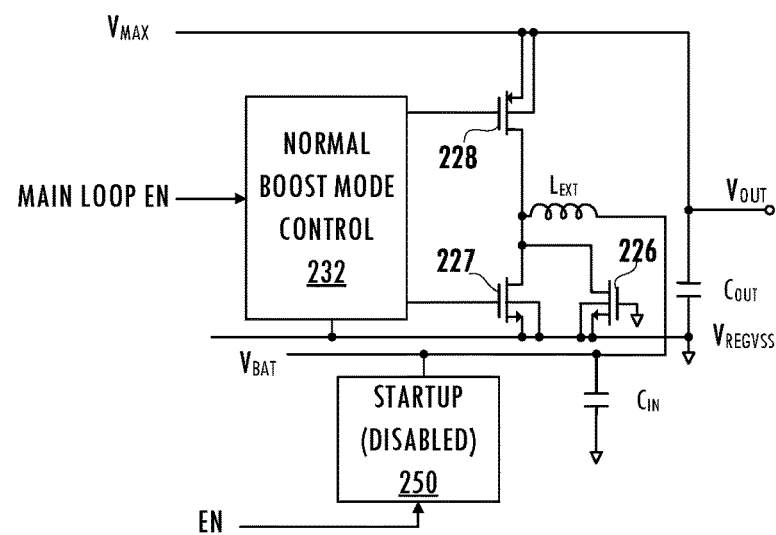
FIG. 16 illustrates a functional block diagram of the DC-DC voltage converter of FIG. 4 dynamically biased in a normal boost mode of operation consistent with at least one embodiment of the invention.
Figure 17:
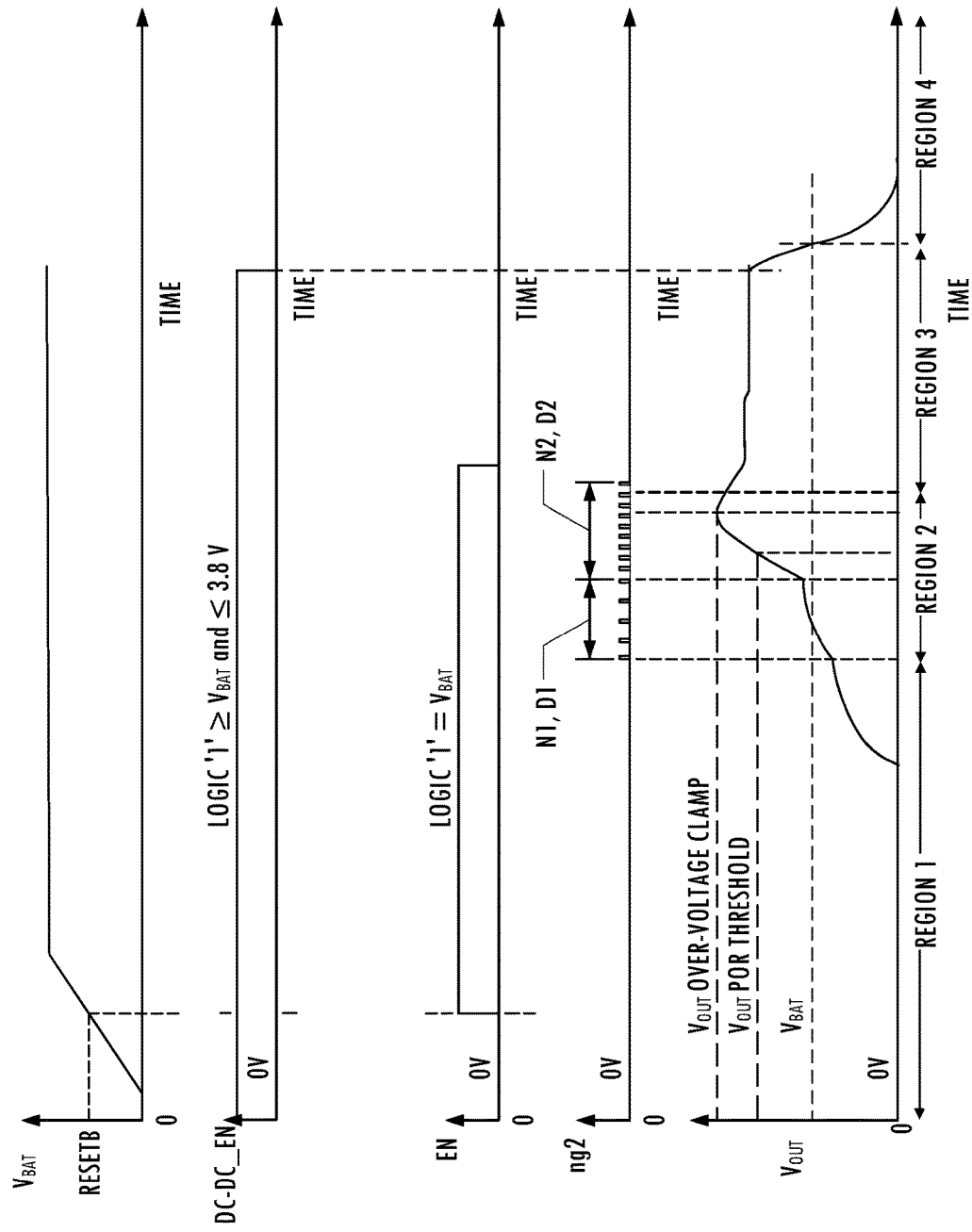
FIG. 17 illustrates exemplary waveforms for the DC-DC voltage converter of FIG. 4 consistent with at least one embodiment of the invention.

FIGS. 4, 5, and 14-17 illustrate dynamic biasing of the bulk terminal and gate terminal of transistor 228 in the various modes of operating DC-DC voltage converter 200. Referring to FIGS. 4, 14, and 17, during the RC charging phase of the multi-phase startup mode of operation (e.g., region 1 of the waveforms), the gate terminal and the bulk terminal are coupled to the $V_{BAT}$ input node. In response to RESETB transitioning from an active level to an inactive level, and DC-DC_EN having an active level (e.g., DC-DC_EN='1'), control signal EN transitions to an active level while control signal BOOST_ON signal is at an inactive level, output voltage $V_{OUT}$ increases from 0 V to approach input voltage $V_{BAT}$. In response to output voltage $V_{OUT}$ being substantially equal to but less than (e.g., within 25% or less below) input voltage $V_{BAT}$, control signal CTL1 transitions to an active level and causes programmable delay 206 to start the internal counter and DC-DC voltage converter 200 enters lower frequency and lower duty cycle phase of multi-phase startup operation.

Referring to FIGS. 4, 5, 15, and 17, during lower frequency and lower duty cycle phase of multi-phase startup operation or higher frequency and higher duty cycle phase of multi-phase startup operation (region 2 of the waveforms), transistor 227 is disabled (e.g., the gate terminal of the n-type transistor is coupled to ground). Channel operation of transistor 228 is off and a drain-to-bulk diode of transistor 228 is configured as a synchronous rectifier. The gate terminal and the bulk terminal of transistor 228 are coupled to the $V_{OUT}$ output node. Transistor 226 is controlled by startup circuit 250 via control signal ng2 based on divide ratio N1 (e.g., 32) and duty cycle D1 or divide ratio N2 (e.g., 12) and duty cycle D2 and clock signal CLK (e.g., 25 MHz).

Referring to FIGS. 4, 5, 16, and 17, in response to normal boost mode control circuit 232 asserting control signal BOOST_ON, which causes control signal EN to become inactive, thereby disabling startup circuit 250 and transistor 226, DC-DC voltage converter 200 enters a normal boost mode of operation (e.g., region 3 of the waveforms). Transistor 228 and transistor 227 are active and controlled by normal boost mode control circuit 232 e.g., using pulsed-frequency modulation. Normal boost mode control circuit 232 maintains output voltage $V_{OUT}$ finely regulated around (e.g., within +/−5%) a precision threshold voltage (e.g., $V_{REF2}$ or a scaled version of $V_{REF2}$).

In response to control signal DC-DC_EN transitioning to an inactive level (e.g., DC-DC_EN='0'), normal boost mode control circuit 232 is disabled and RC charging phase switch control circuit 234 and bulk switching circuitry 236 coupled the gate terminal of transistor 228 and the bulk terminal of transistor 228 to the $V_{BAT}$ input node, as illustrated in FIG. 14 and region 4 of FIG. 17. Note that DC-DC voltage converter 200 has the same configuration of transistor 226, transistor 227, and transistor 228 in regions 1 and 4. However, due to hysteresis in comparators 246, DC-DC voltage converter 200 exits region 1 in response to output voltage $V_{OUT}$ approaching input voltage $V_{BAT}$ from 0 V at the beginning of region 1 and DC-DC voltage converter 200 enters region 4 in response to output voltage $V_{OUT}$ falling below input voltage $V_{BAT}$ from a target output voltage level greater than input voltage $V_{BAT}$.

Figure 18:
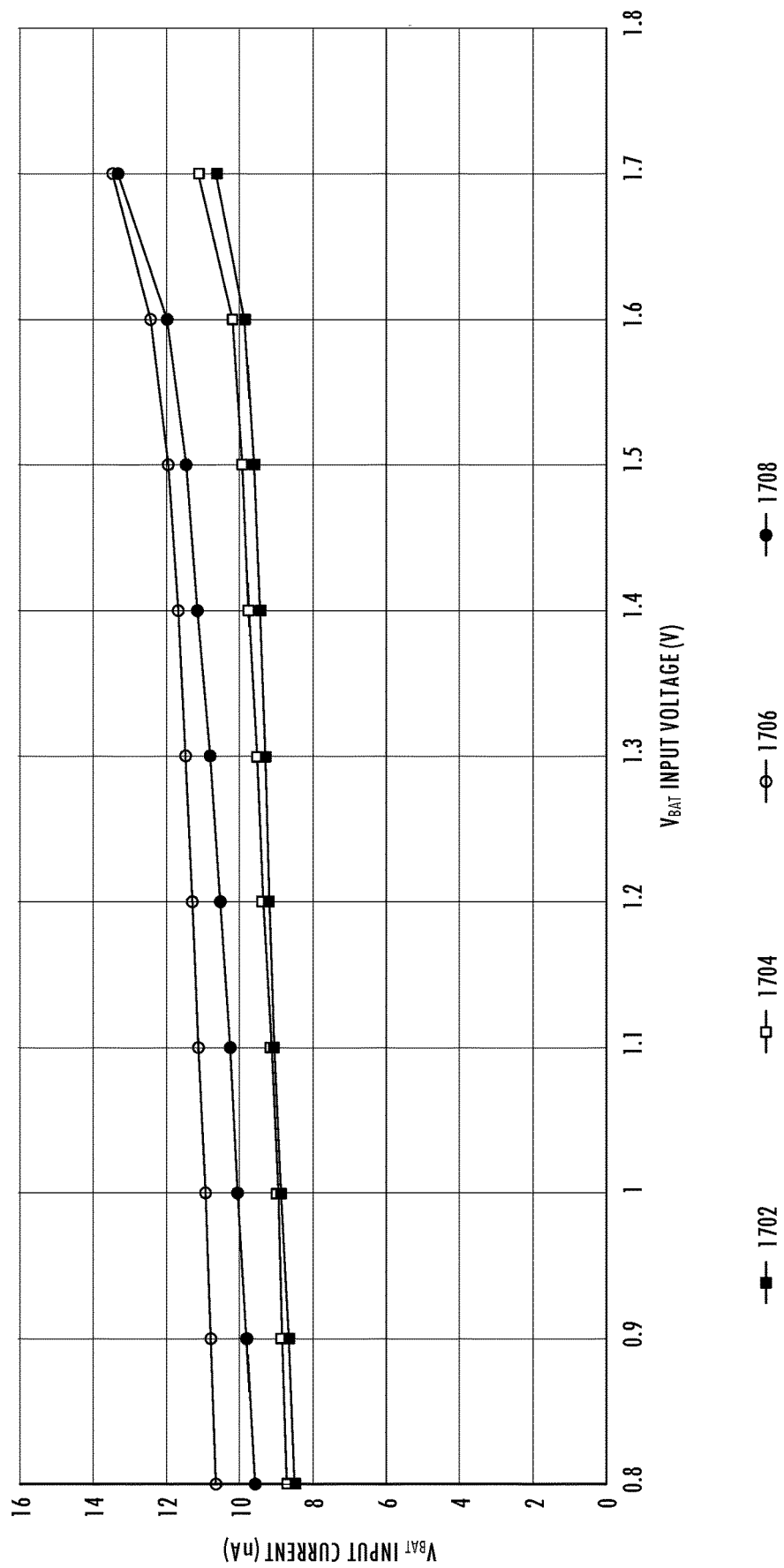
FIG. 18 illustrates exemplary input current in shutdown mode as a function of output voltage for multiple DC-DC voltage converters of FIG. 4 on multiple typical manufactured integrated circuit devices consistent with at least one embodiment of the invention.

FIG. 18 illustrates input current of DC-DC voltage converter 200 configured in shutdown mode as a function of input voltage $V_{BAT}$ under typical conditions for multiple instantiations of DC-DC voltage converter 200 on different integrated circuits. In the shutdown mode, DC-DC voltage converter 200 consumes ultra-low power, e.g., currents of approximately 10 nA when coupled to a battery providing an input voltage $V_{BAT}$ of 0.8 V to 1.7 V as compared to normal operation power consumption of input current of several tens of mA for input voltage $V_{BAT}$ of 0.8 V to 1.7 V when supporting output load currents of up to 25 mA. Thus, DC-DC voltage converter 200 consumes ultra-low power in a shutdown mode, thereby increasing life of a battery in a product operatively coupled to a battery.

Thus, improved techniques for DC-DC voltage conversion have been described. The techniques eliminate excessive current buildup during startup of a DC-DC voltage converter operating in a boost mode that guarantees that current through the inductor at startup is less than or equal to the current during normal operation has been disclosed. In some embodiments, the techniques reduce the cost of the inductor and the power transistor. In some embodiments, the techniques reduce power consumption in a shutdown mode and increase battery life of an application. The description of the invention set forth herein is illustrative and is not intended to limit the scope of the invention as set forth in the following claims. For example, while the invention has been described in an embodiment in which a particular RC circuit is used to charge the output node in a soft-start phase of startup, one of skill in the art will appreciate that the teachings herein can be utilized with other circuits that deliver charge to the output node at an appropriate rate (e.g., current source charging of output capacitor $C_{OUT}$).

The terms "first," "second," "third," and so forth, as used in the claims, unless otherwise clear by context, are to distinguish between different items in the claims and do not otherwise indicate or imply any order in time, location or quality. For example, "a first received signal" and "a second received signal," do not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for operating a DC-DC converter circuit comprising:
   in response to detecting a startup condition, charging an output capacitance coupled to an output node of the DC-DC converter circuit at a first rate in a first phase of a multi-phase startup mode of operation of the DC-DC converter circuit; and
   in response to an indication of an output voltage on the output node approaching an input voltage on an input node of the DC-DC converter circuit, controlling a current through an inductor using an oscillating signal in a second phase of the multi-phase startup mode of operation, thereby adjusting the output voltage to equal a target voltage level.

2. The method as recited in claim 1, wherein the first rate is a rate of charging an RC circuit including the output capacitance coupled to the output node.

3. The method as recited in claim 1, further comprising:
   in response to a predetermined number of periods of the oscillating signal or the output voltage exceeding a predetermined threshold level, entering a third phase of the multi-phase startup mode of operation from the second phase of the multi-phase startup mode of operation, the oscillating signal having a higher frequency in the third phase of the multi-phase startup mode of operation than in the second phase of the multi-phase startup mode of operation.

4. The method as recited in claim 3 wherein in the third phase of the multi-phase startup mode of operation, the oscillator signal has a higher duty cycle than in the second phase of the multi-phase startup mode of operation.

5. The method as recited in claim 1 further comprising:
   while in the second phase of the multi-phase startup mode of operation, in response to the output voltage exceeding a threshold voltage, disabling charge delivery to the output node.

6. The method as recited in claim 1 further comprising:
   generating a second indication of whether the output voltage is approximately equal to the input voltage using a first comparator circuit and a second comparator circuit, the first comparator circuit having a lower resolution and a lower power consumption than the second comparator circuit; and
   biasing a bulk terminal and a gate terminal of a transistor having a source terminal coupled to the output node based on the second indication.

7. The method as recited in claim 6 further comprising:
   disabling the second comparator circuit before entering a normal mode of operation including controlling the transistor to regulate the output voltage.

8. The method as recited in claim 6 wherein in the first phase of the multi-phase startup mode of operation the bulk terminal and the gate terminal of the transistor are coupled to the input node.

9. The method as recited in claim 6 wherein in the second phase of the multi-phase startup mode of operation the bulk terminal and the gate terminal of the transistor are coupled to the output node.

10. A DC-DC converter circuit comprising:
    an input node;
    an output node;
    an output capacitance coupled to the output node; and
    a control circuit configured to cause the output capacitance to be charged at a first rate in a first phase of a multi-phase startup mode of operation and, in response to an indication of an output voltage on the output node approaching an input voltage on the input node, to control a current through an inductor using an oscillating signal in a second phase of the multi-phase startup mode of operation to cause the output voltage to equal a target voltage level.

11. The DC-DC converter circuit as recited in claim 10, wherein the first rate is a rate of charging an RC circuit including the output capacitance coupled to the output node.

12. The DC-DC converter circuit as recited in claim 10, wherein a frequency of the oscillating signal is higher in a third phase of the multi-phase startup mode of operation than in the second phase of the multi-phase startup mode of operation, the third phase of the multi-phase startup mode of operation being entered in response to a predetermined number of periods of the oscillating signal or the output voltage exceeding a predetermined threshold level.

13. The DC-DC converter circuit as recited in claim 12 wherein in the third phase of the multi-phase startup mode of operation, the oscillator signal has a higher duty cycle than in the second phase of the multi-phase startup mode of operation.

14. The DC-DC converter circuit as recited in claim 10, wherein the control circuit is further configured to disable charge delivery to the output node in response to the output voltage exceeding a threshold voltage while in the second phase of the multi-phase startup mode of operation.

15. The DC-DC converter circuit as recited in claim 10 further comprising:
    a transistor including a source terminal coupled to the output node, a drain terminal, a gate terminal, and a bulk terminal;
    a comparator circuit configured to generate a second indication of a comparison of the input voltage to the output voltage, the comparator circuit including a first comparator circuit and a second comparator circuit, the first comparator circuit having a lower resolution and a lower power consumption than the second comparator circuit; and
    a second control circuit configured to bias the bulk terminal and the gate terminal based on the second indication.

16. The DC-DC converter circuit as recited in claim 15, wherein the control circuit is further configured to cause the bulk terminal and the gate terminal to be coupled to the input node in the first phase of the multi-phase startup mode of operation and to cause the bulk terminal and the gate terminal to be coupled to the output node in the second phase of the multi-phase startup mode of operation.

17. The DC-DC converter circuit as recited in claim 15, wherein in the first phase of the multi-phase startup mode of operation the bulk terminal and the gate terminal are coupled to the input node, and
    wherein in the second phase of the multi-phase startup mode of operation the bulk terminal and the gate terminal are coupled to the output node.

18. The DC-DC converter circuit as recited in claim 15 further comprising:
    a third comparator configured to generate a third indication of a third comparison of the output voltage to a power-on-reset threshold voltage level,
    wherein the control circuit is operable to selectively enable a normal mode of operation based on the third indication.

19. The DC-DC converter circuit as recited in claim 15 further comprising:
    a back-to-back p-type transistor network coupled in parallel to the transistor and configured to ensure that the bulk terminal is coupled to the higher of the input voltage on the input node and the output voltage on the output node.

20. A method for operating a DC-DC converter circuit comprising:

generating an indication of whether an output voltage on an output node of the DC-DC converter circuit is approximately equal to an input voltage on an input node of the DC-DC converter circuit using a first comparator circuit and a second comparator circuit, the first comparator circuit having a lower resolution and lower power consumption than the second comparator circuit; and biasing a bulk terminal and a gate terminal of a transistor having a source terminal coupled to the output node based on the indication.

* * * * *